US012641377B2

(12) United States Patent
Klint

(10) Patent No.: US 12,641,377 B2
(45) Date of Patent: May 26, 2026

(54) HEARING AID HAVING ACCELERATION BASED DISCOVERABILITY

(71) Applicant: Oticon A/S, Smørum (DK)

(72) Inventor: Lars Klint, Smørum (DK)

(73) Assignee: Oticon A/S, Smørum (DK)

( * ) Notice: Subject to any disclaimer, the term of this patent is extended or adjusted under 35 U.S.C. 154(b) by 129 days.

(21) Appl. No.: 18/616,303

(22) Filed: Mar. 26, 2024

(65) Prior Publication Data

US 2024/0348990 A1 Oct. 17, 2024

(30) Foreign Application Priority Data

Apr. 17, 2023 (EP) .................................... 23168210

(51) Int. Cl.
*H04R 25/00* (2006.01)

(52) U.S. Cl.
CPC .................................... *H04R 25/30* (2013.01)

(58) Field of Classification Search
CPC ................ H04R 1/1041; H04R 1/1091; H04R 2225/55; H04R 25/30; H04R 25/554
USPC ........................................................ 381/312
See application file for complete search history.

(56) References Cited

U.S. PATENT DOCUMENTS

2015/0254962 A1 9/2015 Lee et al.

FOREIGN PATENT DOCUMENTS

| | | | |
|---|---|---|---|
| DE | 102017201457 | B3 | 5/2018 |
| EP | 2908549 | A1 | 8/2015 |
| KR | 20140081945 | A | 7/2014 |
| WO | 2020/124022 | A2 | 6/2020 |
| WO | 2022/062252 | A1 | 3/2022 |

*Primary Examiner* — Phylesha Dabney

(57) ABSTRACT

Disclosed herein are methods for determining a location of a hearing aid, performed by an electronic device having a processor, a memory, and interface circuitry. The method includes obtaining first accelerometer data from a hearing aid. The method includes obtaining second accelerometer data from the electronic device. The method includes determining, based on the first accelerometer data and the second accelerometer data, an acceleration parameter indicative of a difference between the first accelerometer data and the second accelerometer data. In accordance with the acceleration parameter meeting a safety criterion, the method includes generating lost control data and outputting the lost control data to the hearing aid.

17 Claims, 3 Drawing Sheets

HEARING AID HAVING ACCELERATION BASED DISCOVERABILITY

SUMMARY

A Hearing Aid:

In an aspect of the present application, a method is provided. The method is for determining a location of a hearing aid. The method is performed by an electronic device having a processor. The method is performed by an electronic device having a memory. The method is performed by an electronic device having interface circuitry. The method includes obtaining first accelerometer data from a hearing aid. The method includes obtaining second accelerometer data from the electronic device. The method includes determining, based on the first accelerometer data and the second accelerometer data, an acceleration parameter. The acceleration parameter can be indicative of a difference between the first accelerometer data and the second accelerometer data. In accordance with the acceleration parameter meeting a safety criterion, the method can include generating lost control data. In accordance with the acceleration parameter meeting a safety criterion, the method can include outputting the lost control data to the hearing aid. In accordance with the acceleration parameter not meeting a safety criterion, the method can include not generating lost control data. In accordance with the acceleration parameter not meeting a safety criterion, the method can include not outputting the lost control data to the hearing aid.

Advantageously, the disclosed method can use accelerometer data to drive visual and/or auditory cues for a lost hearing aid, thereby improving the user's ability to find the lost hearing aid. Further, the disclosed methods can be advantageously used for finding lost hearing aids while avoiding any negative hearing effects to a user. For example, one of the improvements to finding a hearing aid disclosed herein would be to let the hearing aid play a sound signal, when it is being located. Previously, due to regulatory reasons and/or hazard analyses, a lost hearing aid has not been allowed to play any sounds while being located, which would otherwise make the locating of the hearing aid significantly easier. However, playing sound at the needed volume for locating the hearing aid while the user is wearing the hearing aid can introduce temporary or even permanent worsening of the user's hearing loss. Advantageously, the disclosed methods can allow for improved detection of a hearing aid while still avoiding damaging a user's hearing.

The electronic device can be one of many types of electronic devices, each having their own advantages. In one or more example methods, the electronic device includes a mobile telephone. The mobile phone can communicate, such as via interface circuitry, with one or more secondary electronic devices, such as a secondary electronic device. For example, a hearing aid can be one of the one or more secondary electronic devices. A server can be one of the one or more secondary electronic devices. In one or more example methods, the electronic device includes a server. The server can communicate, such as via interface circuitry, with one or more secondary electronic devices. For example, a hearing aid can be one of the one or more secondary electronic devices. A mobile telephone can be one of the one or more secondary electronic devices. The electronic device and/or the one or more secondary electronic devices can be one or more of: a tablet, a computer, a laptop, a wearable device, a smart watch, a cellular phone, and a server. As used herein, electronic device and secondary electronic device may be interchangeable.

The electronic device can be configured to communicate, such as via interface circuitry, with one or more intermediate devices. The one or more intermediate devices can be one or more secondary electronic devices. The one or more intermediate devices can be configured to communication with the hearing aid. For example, the electronic device can be in communication with a server (e.g., as one of the one or more intermediate devices), which can in turn be in communication with the hearing aid.

Embodiment of the disclosed method can be advantageous for determining a location of a hearing aid, in particular a missing (e.g., misplaced, hidden, lost) hearing aid. It will be understood that the method may not guarantee a determination of the exact location of a hearing aid. The method can provide guidance to a user in order to help determine the location of a hearing aid. Advantageously, embodiments of the disclosed method can improve the user's ability to find a lost hearing aid while preventing any hearing damage to the user.

The method can include obtaining (e.g., receiving) first accelerometer data from a hearing aid. The first accelerometer data can be indicative of an acceleration of the hearing aid. For example, the first accelerometer data can be indicative of movement (e.g., motion) of the hearing aid. In one or more example methods, the hearing aid can include a first accelerometer configured to determine the first accelerometer data. In one or more example methods, the hearing aid can include a first gyroscope configured to determine the first accelerometer data. The first accelerometer data can be indicative of the particular acceleration of the hearing aid.

For example, the first accelerometer data can be in meters per second. The first accelerometer data can be a binary true or false to whether the hearing aid is accelerating.

In one or more example methods, the first accelerometer data can be indicative of continuous movement (e.g., continuous acceleration). For example, obtaining the first accelerometer data can include continuously obtaining first accelerometer data indicative of continuous movement from a first gyroscope. In one or more example methods, the first accelerometer data can be indicative of changes in movement (e.g., changes of acceleration). For example, obtaining the first accelerometer data can include continuously obtaining first accelerometer data indicative of changes of movement from a first accelerometer. In one or more example methods, obtaining the first accelerometer data comprises obtaining the first accelerometer data from a first accelerometer and/or a first gyroscope.

The electronic device can be configured to receive the first accelerometer data from the hearing aid. The electronic device can be configured to receive the first accelerometer data from an intermediate device, which may obtain the first accelerometer data from the hearing aid. The electronic device can request the first accelerometer data from the hearing aid. For example, method can include transmitting a request for the first accelerometer data from the electronic device to the hearing aid.

The method can include obtaining (e.g., receiving) second accelerometer data from electronic device. Obtaining the second accelerometer data can include determining the second accelerometer data. The method can include obtaining second accelerometer data from one or more secondary electronic devices.

The second accelerometer data can be indicative of an acceleration of the electronic device (or the one or more secondary electronic devices). For example, the second accelerometer data can be indicative of movement (e.g., motion) of the electronic device. In one or more example methods, the electronic device can include a second accelerometer configured to determine the second accelerometer data. In one or more example methods, the electronic device can include a second gyroscope configured to determine the second accelerometer data. The second accelerometer data can be indicative of the particular acceleration of the electronic device. The second accelerometer data can be a binary true or false to whether the electronic device is accelerating.

In one or more example methods, the second accelerometer data can be indicative of continuous movement (e.g., continuous acceleration). For example, obtaining the second accelerometer data can include continuously obtaining second accelerometer data indicative of continuous movement from a second gyroscope. In one or more example methods, the second accelerometer data can be indicative of changes in movement (e.g., changes of acceleration). For example, obtaining the second accelerometer data can include continuously obtaining second accelerometer data indicative of changes of movement from a second accelerometer. In one or more example methods, obtaining the second accelerometer data comprises obtaining the second accelerometer data from a second accelerometer and/or a second gyroscope.

The method can include receiving the second accelerometer data from the electronic device (e.g., itself). The method can include receiving the second accelerometer data from an intermediate device, which may obtain the second accelerometer data from the electronic device.

The method can include obtaining (e.g., receiving) second accelerometer data from a secondary electronic device (e.g., one of one or more secondary electronic devices). For example, the electronic device may be a server and the secondary electronic device may be a mobile telephone. The second accelerometer data can be indicative of an acceleration of the secondary electronic device. For example, the second accelerometer data can be indicative of movement (e.g., motion) of the secondary electronic device. In one or more example methods, the secondary electronic device can include an accelerometer configured to determine the second accelerometer data. The second accelerometer data can be indicative of the particular acceleration of the secondary electronic device. The second accelerometer data can be a binary true or false to whether the secondary electronic device is accelerating.

The method can include receiving the second accelerometer data from the secondary electronic device. The method can include receiving receive the second accelerometer data from an intermediate device, which may obtain the second accelerometer data from the secondary electronic device. The method can include requesting the second accelerometer data from the secondary electronic device. For example, method can include transmitting a request for the second accelerometer data from the electronic device to the secondary electronic device.

While obtaining first and second accelerometer data is discussed herein, other types of data can be used as well. For example, first and second speed or velocity data can be obtained in a similar manner. Accordingly, all instances of accelerometer and/or acceleration can be replaced with speed and/or velocity.

The electronic device and/or the hearing aid may comprise a number of detectors configured to provide status signals relating to a current physical environment of the electronic device and/or the hearing aid (e.g. the current acoustic environment), and/or to a current state of the user wearing the hearing aid, and/or to a current state or mode of operation of the electronic device and/or the hearing aid. Alternatively or additionally, one or more detectors may form part of an external device in communication (e.g. wirelessly) with the hearing aid and/or the electronic device. The number of detectors may comprise a movement detector, e.g. an acceleration sensor (such as an accelerometer). The movement detector may be configured to detect movement of the user's facial muscles and/or bones, e.g. due to speech or chewing (e.g. jaw movement) and to provide a detector signal indicative thereof.

The method can include determining an acceleration parameter based on the first accelerometer data and the second accelerometer data. The acceleration parameter can be indicative of a difference between the first accelerometer data and the second accelerometer data. For example, the accelerator parameter can be indicative of a numeric difference between the first accelerometer data and the second accelerometer data. In other words, the acceleration parameter can be indicative of the acceleration difference between first accelerometer data and the second accelerometer data. For example, the first accelerometer data may be indicative of an acceleration of 0.5 $m/s^2$ and the second accelerometer data may be indicative of an acceleration of 1.0 $m/s^2$. Accordingly, the accelerator parameter can be indicative of a difference of 0.5 $m/s^2$.

In one or more example methods, the acceleration parameter can be indicative of whether there is a difference between the first accelerometer data and the second accelerometer data. For example, if both the first accelerometer data and the second accelerometer data are indicative of no acceleration, the acceleration parameter can be indicative of no difference between the first accelerometer data and the second accelerometer data. For example, if the first accelerometer data is indicative of an acceleration and the second accelerometer data is indicative of no acceleration, the acceleration parameter can be indicative of a difference between the first accelerometer data and the second accelerometer data. For example, if both the first accelerometer data and the second accelerometer data are indicative of acceleration, the acceleration parameter can be indicative of no difference between the first accelerometer data and the second accelerometer data.

The method can include continuously determining the acceleration parameter. The method can include determining the acceleration parameter at particular time periods. The method can include determining the acceleration parameter only when receiving input from a user that a hearing aid is missing.

The safety criterion can be considered a criterion that, upon meeting, certain actions can be taken in the method. The safety criterion can be used to prevent harm or damage to a user of a hearing aid.

In one or more example methods, the acceleration parameter can meet the safety criterion if the acceleration parameter is indicative of the hearing aid not being in acceleration (e.g., via the first accelerometer data) and the electronic device being in acceleration (e.g., via the second accelerometer data). In one or more example methods, the acceleration parameter can meet the safety criterion if the acceleration parameter is indicative of the hearing aid being in acceleration (e.g., via the first accelerometer data) and the electronic device not being in acceleration (e.g., via the second accelerometer data). In one or more example methods, the acceleration parameter can meet the safety criterion if the acceleration parameter is indicative of the hearing aid having a different acceleration (e.g., via the first accelerometer data) than an acceleration of the electronic device (e.g., via the second accelerometer data). In one or more example methods, the acceleration parameter can meet the safety criterion if the acceleration parameter is indicative of the hearing aid having an acceleration (e.g., via the first accelerometer data) that is greater than an acceleration threshold an acceleration of the electronic device (e.g., via the second accelerometer data). In other words, the acceleration parameter can meet the safety criterion if the acceleration parameter is indicative of a difference of acceleration between the hearing aid and the electronic device being greater than the acceleration threshold.

In one or more example methods, the acceleration parameter does not meet the safety criterion if the acceleration parameter is indicative of the hearing aid not being in acceleration (e.g., via the first accelerometer data) and the electronic device not being in acceleration (e.g., via the second accelerometer data). In one or more example methods, the acceleration parameter does not meet the safety criterion if the acceleration parameter is indicative of the hearing aid being in acceleration (e.g., via the first accelerometer data) and the electronic device being in acceleration (e.g., via the second accelerometer data). In one or more example methods, the acceleration parameter does not meet the safety criterion if the acceleration parameter is indicative of the hearing aid having the same acceleration (e.g., via the first accelerometer data) as an acceleration of the electronic device (e.g., via the second accelerometer data). In other words, the acceleration parameter does not meet the safety criterion if the acceleration parameter is indicative of the hearing aid and the electronic device having the same acceleration.

In accordance with the acceleration parameter meeting the safety criterion, the method can include generating lost control data. In accordance with the acceleration parameter meeting the safety criterion, the method can include outputting the lost control data to the hearing aid. The lost control data can be indicative of an action to be taken by the hearing aid. In one or more examples, the lost control data includes instructions for the hearing aid. In accordance with the acceleration parameter not meeting the safety criterion, the method can include not generating lost control data. In accordance with the acceleration parameter not meeting the safety criterion, the method can include not outputting the lost control data to the hearing aid.

The hearing aid and/or the electronic device may include a wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The electronic device and/or the hearing aid may comprise antenna and transceiver circuitry allowing a wireless link to an entertainment device (e.g. a TV-set), a communication device (e.g. a telephone), a wireless microphone, or another hearing aid, etc. The electronic device and/or the hearing aid may thus be configured to wirelessly receive a direct electric input signal from another device. Likewise, the electronic device and/or the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the electronic device and/or the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

Advantageously, the disclosed method can have the ability to detect and differentiate between the following two situations when the hearing aid is connected but lost. First, a “dangerous situation” where the method does not allow the hearing aid to play sounds, e.g., detection of movement correlated with a person wearing the hearing aid. Second, a “safe situation” where the hearing aid is stationary, e.g., lying on the floor, a table etc., where it will be safe to play (loud) sounds from the hearing aid.

If the method obtains first accelerometer data indicating hearing aid acceleration at the same time as the user is moving (e.g., when the first accelerometer data and the second accelerometer data are indicative of movement) and no or limited movement when the user is standing still (e.g., when the first accelerometer data and the second accelerometer data re indicative of no movement), the method can determine that the hearing aid is most likely on the user—not necessarily on the ear of the user, but maybe in a pocket, bag or purse carried by the user.

On the other hand, if the hearing aid remains still while the user is moving around (e.g., the first accelerometer data is indicative of acceleration and the second accelerometer data is indicative of no acceleration), the method can include informing the user that the hearing aid is lying still somewhere. The method can request the user for permission to play (a) sound signal(s), informing the user about the possible danger of doing so, if the hearing aid is (anyway) placed on the ear (or on the ear of someone else).

In one or more example methods, the method can include causing, based on the acceleration parameter, an indicator to be output by the electronic device. For example, the indicator can show that the hearing aid is accelerating and/or not accelerating.

In one or more example methods, after generating the lost control data and outputting the lost control data, the method includes obtaining third accelerometer data from a hearing aid. The method can include, in accordance with the third accelerometer data being indicative of movement, generating stop control data and outputting the stop control data to the hearing aid. The method can include, in accordance with the third accelerometer data not being indicative of movement, not generating stop control data and not outputting the stop control data to the hearing aid. For example, the playback of the audio signal by the hearing aid can be configured to stop if the accelerometer detects movement. The stop control data can include instructions for the hearing aid to stop outputting the auditory signal. Upon receiving the stop control data, the hearing aid can stop outputting the auditory signal. The stop control data may be indicative of, such as including instructions for, the hearing aid to stop taking any action. This can include the auditory signal, vibration, etc. discussed herein. In one or more example methods, after generating the lost control data and outputting the lost control data, the method includes obtaining third accelerometer data from the first accelerometer and/or the first gyroscope.

In one or more example methods, the third accelerometer data can be indicative of continuous movement (e.g., continuous acceleration). For example, obtaining the third accelerometer data can include continuously obtaining third accelerometer data indicative of continuous movement from the first gyroscope. In one or more example methods, the third accelerometer data can be indicative of changes in movement (e.g., changes of acceleration). For example, obtaining the third accelerometer data can include continuously obtaining third accelerometer data indicative of changes of movement from the first accelerometer.

In one or more example methods, the method can include continuously determining the acceleration parameter and determining whether the acceleration parameter meets the safety criterion (e.g., obtaining the third accelerometer data). For example, the method can include determining the acceleration parameter at specific time intervals and determining whether the acceleration parameter meets the safety criterion at said time interval. The method can include obtaining the third accelerometer data at the time interval. In some methods, as soon as the method determines that the acceleration parameter does not meet the safety criterion, the method can include stopping generating lost control data and/or stopping outputting the lost control data to the hearing aid. In one or more example methods, in accordance with determining that the acceleration parameter does not meet the safety criterion, the method can include generating stop control data and/or outputting the stop control data to the hearing aid.

For example, the method may determine that the acceleration parameter meets the safety criterion because the first accelerometer data is indicative of no acceleration of the hearing aid and the second accelerometer data is indicative of acceleration of the electronic device.

Accordingly, the method can include generating the lost control data and outputting the lost control data to the hearing aid. However, the particular obtained first accelerometer data may be incorrect, and that the next time the method obtains the accelerometer data from the hearing id (e.g., the third accelerometer data) the third accelerometer data is indicative of the hearing aid being in motion. The method can then determine that the acceleration parameter does not meet the safety criterion, and therefore generates the stop control data and outputs the stop control data to the hearing aid. In this way, the hearing aid may not have made any auditory signal at this point, or immediately stops outputting the auditory signal. This can advantageously reduce and/or eliminate potential damage to a user's ear.

In one or more example methods, the lost control data comprises instructions for the hearing aid to output an auditory signal. The auditory signal can be an auditory signal louder than what would typically be provided to the user while wearing the hearing aid. If the hearing aid were still in the user's ear, the auditory signal may be loud enough to damage the user's hearing. This is why it is advantageous to generate the lost control data comprising instructions for the hearing aid to output the auditory signal only upon the acceleration parameter meeting the safety criterion. The auditory signal may be one or more of: a tone, a beep, repeated beeps, and spoken words. The auditory signal may be louder than a maximum output of the hearing aid while in use. The auditory signal may be greater than 100, 120, 150, 200 dB. The auditory signal may be loud enough to cause damage to a user's hearing if the user was wearing the hearing aid.

The hearing aid may comprise an output unit for providing a stimulus perceived by the user as an acoustic signal based on a processed electric signal. The same output unit can be used to output the auditory signal according to the disclosed method. In some example methods, a second output unit can be used to output the auditory signal according to the disclosed method. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

In one or more example methods, the lost control data comprises instructions for the hearing aid to vibrate and/or output a light. The lost control data may comprise instructions for the hearing aid to vibrate and/or output a light and/or output an auditory signal. The method can include receiving instructions from a user on which type of instructions to be included in the lost control data. For example, the method can include receiving instructions from a user that the lost control data only includes instructions to provide the auditory signal. For example, the method can provide instructions to allow LED(s) on hearing aid blink. For example, the instructions can allow the LED(s) to blink in a recognizable pattern to help the user locate the hearing aid in low light environments, e.g., in a dark room, pocket, bag or purse. In some example, methods, the lost control data will instruct the hearing aid to vibrate via a vibrator-mechanism built into the hearing aid. This can further assist the user in locating the lost hearing aid. The lost control data can include more than one of the auditory signal instructions, the vibration instructions, and the light instructions to provide for simultaneous auditive as well as a tactile cues.

In one or more example methods, the lost control data comprises user data indicative of a hearing loss of the user. The hearing aid can be configured to receive the lost control data and, based on the user data, adjust the response to the lost control data. For example, the hearing aid can adjust the loudness of the auditory signal based on the user data. User data indicative of a higher hearing lost can result in the hearing aid outputting a louder auditory signal than if the user data was indicative of a medium hearing loss. Further, the higher loudness may be advantageous as a user with high hearing lost may not be able to detect a lower loudness auditory signal. Since the person trying to locate the lost hearing aid in most cases will be the hearing aid user themselves, they may have difficulties hearing a default tone played back by the hearing aids. But since the audio processing in the hearing aid is fitted to the user's hearing loss, the hearing aid will be able to adapt the sound signal to give the user the optimum possibility to locate the hearing aid.

In one or more example methods, in accordance with the acceleration parameter not meeting the safety criterion, the method includes generating warning control data. In one or more example methods, in accordance with the acceleration parameter not meeting the safety criterion, the method includes causing, based on the warning control signal, an indicator to be output by the electronic device. In one or more example methods, in accordance with the acceleration parameter not meeting the safety criterion, the method includes outputting the warning control data to a secondary electronic device. In one or more example methods, in accordance with the acceleration parameter not meeting the safety criterion, the method includes causing, based on the warning control signal, an indicator to be output by the secondary electronic device. The indicator can be a warning. The indicator can be a request for permission output to a user.

In other words, the method can be used to provide to a user of an electronic device a warning that the acceleration parameter does not meet the safety criterion. In this way, the method notifies a user that they may not want to activate any auditory signal from the hearing aid as it may harm the user. For example, the user may not be paying attention to a hearing aid that is in their ear or may have accidentally set the volume to low in the hearing aid. Advantageously, in situations where the user is still wearing the hearing aid, the method may provide another level of warning to avoid harm to a user.

In one or more example methods, causing the indicator to be output comprises displaying a user interface object indicative of a warning on a display of the electronic device. For example, if the electronic device is a mobile telephone, displaying the user interface object may include displaying a popup warning on the mobile telephone's screen. For example, displaying the user interface object can include displaying the user interface object on an application. In one or more example methods, causing the indicator to be output comprises displaying a user interface object representative of a location of the hearing aid on a display of the electronic device. For example, the user interface object may be a map indicative of the location of the hearing aid. This may provide further guidance to a user in finding the lost hearing aid.

In one or more example methods, after causing the indicator to be output, the method includes receiving a user input. In one or more example methods, in accordance with receiving a user input indicative of an override of the warning control signal, the method includes generating the lost control data. In one or more example methods, in accordance with receiving a user input indicative of an override of the warning control signal, outputting the lost control data to the hearing aid. In one or more example methods, in accordance with not receiving a user input indicative of an override of the warning control signal, the method includes not generating the lost control data. In one or more example methods, in accordance with not receiving a user input indicative of an override of the warning control signal, the method includes not outputting the lost control data to the hearing aid.

In other words, the method can include providing an override option to a user. In other words, the method includes displaying a warning to the user, such as via their mobile telephone and/or application, such as by displaying a user interface object indicative of the warning. Upon displaying the user interface object indicative of the warning, the user may be able to interact with the warning to override the warning. Accordingly, the method can include receiving (such as via a touch screen, audio controls, etc.) the user input indicative of an override of the warning signal. Alternatively, the method can include receiving the user input indicative of no override of the warning signal. For example, the user may want to acknowledge the safety issue without overriding it.

In one or more example methods, the method includes overriding the safety criterion via receiving a user input indicative of an override of the warning control signal. For example, the method can include generating the lost control data and outputting the lost control data to the hearing aid even if the safety criterion is not met by the acceleration parameter, in accordance with receiving the user input indicative of the override. This may advantageously provide a user more control on finding their hearing aid. Further, there may be instances when the safety criterion may be too sensitive, which may not allow for finding the hearing aid without an override by the user.

In one or more example methods, the method further includes obtaining, from the hearing aid, environmental data indicative of a sound environment around the hearing aid. In one or more example methods, the method further includes causing, based on the environmental data, an environmental notification to be output on a display of the electronic device. For example, while the hearing aid is outputting the auditory signal, the microphones on the hearing aid can be used to detect the environment the hearing aid is in. The method can include receiving the environmental data and determining an environmental parameter indicative of a current auditory environment that the hearing aid is in. Example environmental parameters can be indicative of one or more of: a closed space (e.g., pocket, bag, purse), an open space on a hard surface (e.g., a floor, a table, asphalt), an open space on a soft surface (e.g., a bed, a couch, a car seat, a lawn). In one or more example methods, the method further includes causing, based on the environmental parameter, an environmental notification to be output on a display of the electronic device. This can provide information to the user regarding a potential location of their lost hearing aid.

In one or more example methods, the method further includes obtaining, from the hearing aid, environmental data indicative of a sound environment around the hearing aid. In one or more example methods, the method includes determining, based on the environmental data, an environmental parameter indicative of a current auditory environment of the hearing aid.

The hearing aid may comprise an input unit for providing an electric input signal representing sound. The input unit can be configured to receive and/or determine the environmental data. The input unit may comprise an input transducer, e.g. a microphone, for converting an input sound to an electric input signal. The input unit may comprise a wireless receiver for receiving a wireless signal comprising or representing sound and for providing an electric input signal representing said sound.

In one or more example methods, the method includes obtaining feedback data from the hearing aid. In one or more example methods, after outputting the indicator the method includes, in accordance with the feedback data being indicative of a user wearing the hearing aid, the method includes generating stop control data. In one or more example methods, after outputting the indicator the method includes, in accordance with the feedback data being indicative of a user wearing the hearing aid, the method includes outputting the stop control data to the hearing aid. In one or more example methods, after outputting the indicator the method includes, in accordance with the feedback data not being indicative of a user wearing the hearing aid, the method includes not generating stop control data. In one or more example methods, after outputting the indicator the method includes, in accordance with the feedback data not being indicative of a user wearing the hearing aid, the method includes not outputting the stop control data to the hearing aid.

For example, the user may have accidentally overridden the warning control signal even though the hearing aid was still in a user's ear. As another example, the acceleration parameter may be incorrect, such as due to faulty first accelerometer data and/or second accelerometer data. Accordingly, the method can have generated the lost control data and output the lost control data to the hearing aid, which in turn outputs the auditory signal. If the user is wearing the hearing aid, the auditory signal could cause further hearing damage. However, by receiving the feedback data from the hearing aid, the method could include determining whether the user is wearing the hearing aid. In accordance with determining that the feedback data is indicative of the user wearing the hearing aid, the method includes generating stop control data and outputting the stop control data to the hearing aid. The stop control data can include instructions that the hearing aid should stop outputting the auditory signal. In case the user accepts to let the hearing aid output the auditory signal (such as after an override), while they are in fact wearing the hearing aid, the feedback management system in the hearing aid should be able to detect this, stop the playback, and inform the user.

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

An Electronic Device:

In an aspect, an electronic device in communication with a hearing aid is disclosed. The electronic device comprises a memory. The electronic device comprises interface circuitry The electronic device comprises a processor. The processor is configured to obtain first accelerometer data from the hearing aid. The processor is configured to determine second accelerometer data of the electronic device. The processor is configured to determine, based on the first accelerometer data and the second accelerometer data, an acceleration parameter indicative of a difference between the first accelerometer data and the second accelerometer data. The processor is configured to, in accordance with the acceleration parameter meeting a safety criterion, generate lost control data. The processor is configured to, in accordance with the acceleration parameter meeting a safety criterion, generate lost control data output the lost control data to the hearing aid. The processor can be configured to, in accordance with the acceleration parameter not meeting a safety criterion, not generate lost control data. The processor is configured to, in accordance with the acceleration parameter not meeting a safety criterion, not generate lost control data output the lost control data to the hearing aid.

The electronic device can be, for example, a mobile telephone. The electronic device can be configured for communicating with a secondary electronic device.

It is intended that some or all of the embodiments of the method as described above, in the detailed description of the embodiments' or in the claims can be combined with an embodiment of an electronic device, when appropriately substituted by a corresponding process and vice versa. The electronic device can have one or more structural figures configured to perform the method.

Embodiments of the electronic device have the same advantages as the corresponding method.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

Any and/or all of the above disclosure can be carried out by a computer-readable medium or data carrier.

Disclosed herein is a tangible computer-readable medium (a data carrier) storing a computer program comprising program code means (instructions) for causing a data processing system (a computer) to perform (carry out) obtaining first accelerometer data from a hearing aid. The tangible computer-readable medium (a data carrier) can store a computer program comprising program code means (instructions) for causing a data processing system (a computer) to perform (carry out) obtaining second accelerometer data from the electronic device. The tangible computer-readable medium (a data carrier) can store a computer program comprising program code means (instructions) for causing a data processing system (a computer) to perform (carry out) determining, based on the first accelerometer data and the second accelerometer data, an acceleration parameter indicative of a difference between the first accelerometer data and the second accelerometer data. The tangible computer-readable medium (a data carrier) can store a computer program comprising program code means (instructions) for causing a data processing system (a computer) to perform (carry out), in accordance with the acceleration parameter meeting a safety criterion, generating lost control data. The tangible computer-readable medium (a data carrier) can store a computer program comprising program code means (instructions) for causing a data processing system (a computer) to perform (carry out), in accordance with the acceleration parameter meeting a safety criterion, outputting the lost control data to the hearing aid. The tangible computer-readable medium (a data carrier) can store a computer program comprising program code means (instructions) for causing a data processing system (a computer) to perform (carry out), in accordance with the acceleration parameter not meeting a safety criterion, not generating lost control data. The tangible computer-readable medium (a data carrier) can store a computer program comprising program code means (instructions) for causing a data processing system (a computer) to perform (carry out), in accordance with the acceleration parameter not meeting a safety criterion, not outputting the lost control data to the hearing aid.

A Computer Program:

A computer program (product) comprising instructions which, when the program is executed by a computer, cause the computer to carry out (steps of) the method described above, in the 'detailed description of embodiments' and in the claims is furthermore provided by the present application.

Disclosed herein is a computer program (product) comprising instructions which, when the program is executed by a computer, cause the computer to carry out (steps of) obtaining first accelerometer data from a hearing aid. The computer program (product) comprising instructions which, when the program is executed by a computer, cause the computer to carry out (steps of) obtaining second accelerometer data from the electronic device. The computer program (product) comprising instructions which, when the program is executed by a computer, cause the computer to carry out (steps of) determining, based on the first accelerometer data and the second accelerometer data, an accelerometer parameter indicative of a difference between the first accelerometer data and the second accelerometer data. The computer program (product) comprising instructions which, when the program is executed by a computer, cause the computer to carry out (steps of), in accordance with the acceleration parameter meeting a safety criterion, generating lost control data. The computer program (product) comprising instructions which, when the program is executed by a computer, cause the computer to carry out (steps of), in accordance with the acceleration parameter meeting a safety criterion, outputting the lost control data to the hearing aid. The computer program (product) comprising instructions which, when the program is executed by a computer, cause the computer to carry out (steps of), in accordance with the acceleration parameter not meeting a safety criterion, not generating lost control data. The computer program (product) comprising instructions which, when the program is executed by a computer, cause the computer to carry out (steps of), in accordance with the acceleration parameter not meeting a safety criterion, not outputting the lost control data to the hearing aid.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

Disclosed herein is a data processing system comprising a processor and program code means for causing the processor to perform obtaining first accelerometer data from a hearing aid. The data processing system comprising a processor and program code means for causing the processor to perform obtaining second accelerometer data from the electronic device. The data processing system comprising a processor and program code means for causing the processor to perform determining, based on the first accelerometer data and the second accelerometer data, an acceleration parameter indicative of a difference between the first accelerometer data and the second accelerometer data. The data processing system comprising a processor and program code means for causing the processor to perform, in accordance with the acceleration parameter meeting a safety criterion, generating lost control data. The data processing system comprising a processor and program code means for causing the processor to perform, in accordance with the acceleration parameter meeting a safety criterion, outputting the lost control data to the hearing aid. The data processing system comprising a processor and program code means for causing the processor to perform, in accordance with the acceleration parameter not meeting a safety criterion, not generating lost control data. The data processing system comprising a processor and program code means for causing the processor to perform, in accordance with the acceleration parameter not meeting a safety criterion, not outputting the lost control data to the hearing aid.

A Hearing System:

In a further aspect, a hearing system comprising a hearing aid as described above, in the 'detailed description of embodiments', and in the claims, AND a secondary electronic device and/or auxiliary device is moreover provided.

The hearing system may be adapted to establish a communication link between the hearing aid and the secondary electronic device and/or the auxiliary device to provide that information (e.g. control and status signals, possibly audio signals) can be exchanged or forwarded from one to the other.

The secondary electronic device and/or auxiliary device may comprise a remote control, a smartphone, or other portable or wearable electronic device, such as a smartwatch or the like.

The secondary electronic device and/or auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The secondary electronic device and/or auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The secondary electronic device and/or auxiliary device may be constituted by or comprise another hearing aid. The hearing system may comprise two hearing aids adapted to implement a binaural hearing system, e.g. a binaural hearing aid system.

Disclosed herein is a system. The system comprises a hearing aid. The system comprises an electronic device. The electronic device comprises a memory. The electronic device comprises interface circuitry configured to communicate with the hearing aid. The electronic device comprises a processor. The processor is configured to obtain first accelerometer data from the hearing aid. The processor is configured to determine second accelerometer data of the electronic device. The processor is configured to determine, based on the first accelerometer data and the second accelerometer data, an acceleration parameter indicative of a difference between the first accelerometer data and the second accelerometer data. The processor is configured to, in accordance with the acceleration parameter meeting a safety criterion, generate lost control data. The processor is configured to, in accordance with the acceleration parameter meeting a safety criterion, output the lost control data to the hearing aid. The processor is configured to, in accordance with the acceleration parameter not meeting a safety criterion, not generate lost control data. The processor is configured to, in accordance with the acceleration parameter not meeting a safety criterion, not output the lost control data to the hearing aid.

In an aspect of the present application, a method is provided. The method is for determining a location of a hearing aid. The method is performed by an electronic device having a processor. The method is performed by an electronic device having a memory. The method is performed by an electronic device having interface circuitry. The method includes obtaining first accelerometer data from a hearing aid. The method includes obtaining second accelerometer data from a secondary electronic device. The method includes determining, based on the first accelerometer data and the second accelerometer data, an acceleration parameter. The acceleration parameter can be indicative of a difference between the first accelerometer data and the second accelerometer data. In accordance with the acceleration parameter meeting a safety criterion, the method can include generating lost control data. In accordance with the acceleration parameter meeting a safety criterion, the method can include outputting the lost control data to the hearing aid. In accordance with the acceleration parameter not meeting a safety criterion, the method can include not generating lost control data. In accordance with the acceleration parameter not meeting a safety criterion, the method can include not outputting the lost control data to the hearing aid.

In one or more example methods, in accordance with the acceleration parameter not meeting the safety criterion, the method includes generating warning control data. In one or more example methods, in accordance with the acceleration parameter not meeting the safety criterion, the method includes outputting the warning control data to the secondary electronic device. In one or more example methods, in accordance with the acceleration parameter not meeting the safety criterion, the method includes causing, based on the warning control signal, an indicator to be output by the secondary electronic device.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system. For example, the APP may be configured to receive user input, such as receiving a user input indicative of an override of the warning control signal. The APP may be configured to display a user interface object representative of a location of the hearing aid. The APP may be configured to display displaying a user interface object indicative of a warning on a display of the electronic device.

Definitions

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid or may be an external unit in itself (possibly in combination with a flexible guiding element, e.g. a dome-like element).

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system) and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular finding one or more lost hearing aids.

Figure 1:
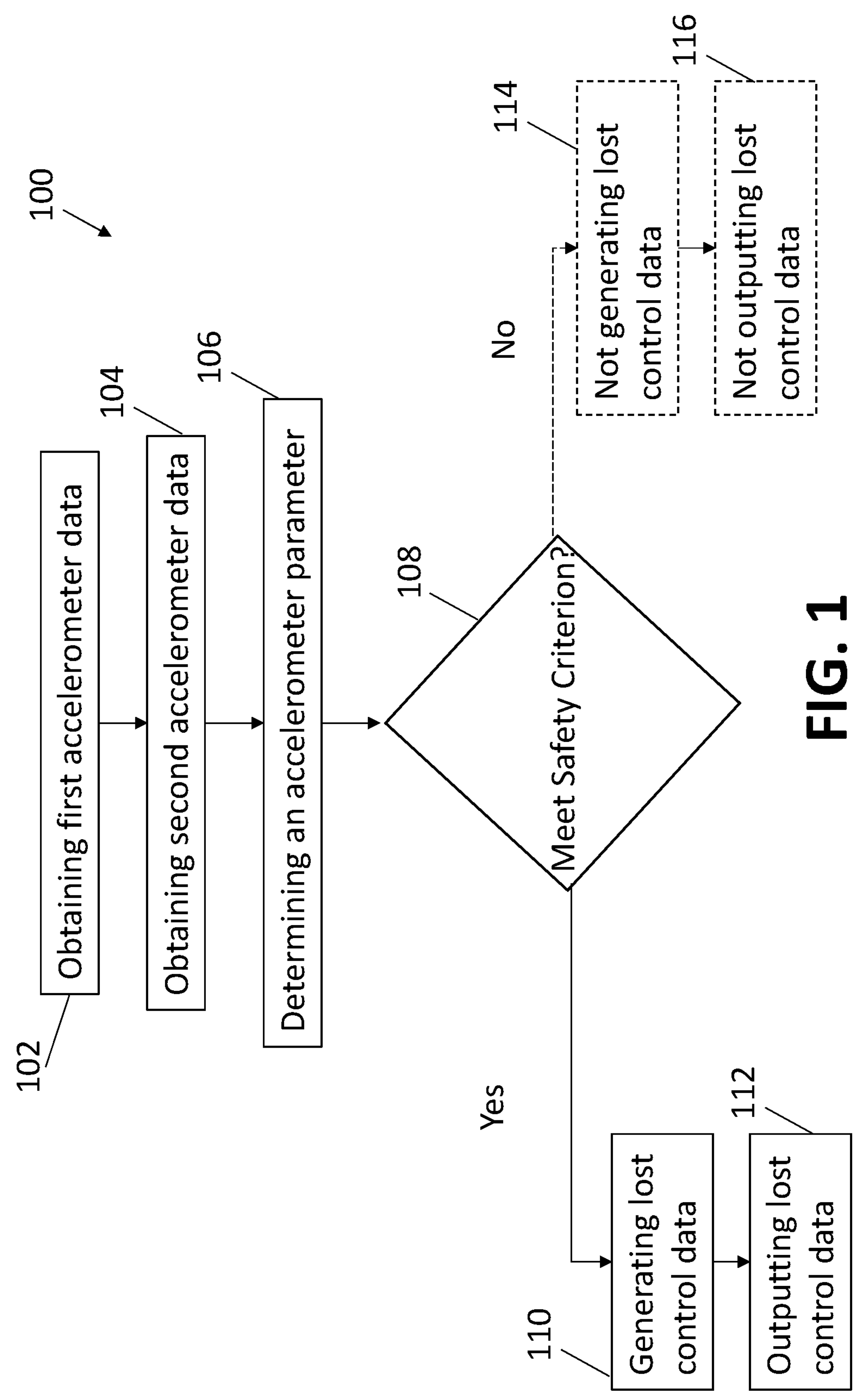
FIG. 1 shows an example embodiment of a method according to the disclosure.

FIG. 1 shows an example embodiment of a method 100 according to the disclosure. The method 100 can be for determining a location of a hearing aid, performed by an electronic device having a processor, a memory, and interface circuitry. The method 100 can include obtaining 102 first accelerometer data from a hearing aid. The method 104 can include obtaining 104 second accelerometer data from the electronic device. The electronic device can be a mobile telephone and/or a server. The method 100 can include determining 106, based on the first accelerometer data and the second accelerometer data, an accelerometer parameter indicative of a difference between the first accelerometer data and the second accelerometer data. In accordance with the accelerometer parameter meeting 108 a safety criterion, the method includes generating 110 lost control data and/or outputting 112 the lost control data to the hearing aid. In accordance with the accelerometer parameter not meeting 108 a safety criterion, the method includes not generating 114 lost control data and/or not outputting 114 the lost control data to the hearing aid.

The method 100 can be performed continuously, or at time intervals. The method 100 can include, after generating the lost control data and outputting the lost control data, obtaining third accelerometer data from a hearing aid and, in accordance with the third accelerometer data being indicative of movement, generating stop control data and outputting the stop control data to the hearing aid.

The lost control data can include instructions for the hearing aid to output an auditory signal. The lost control data can include instructions for the hearing aid to vibrate and/or output a light. The lost control data can include user data indicative of a hearing loss of the user.

Figure 2:
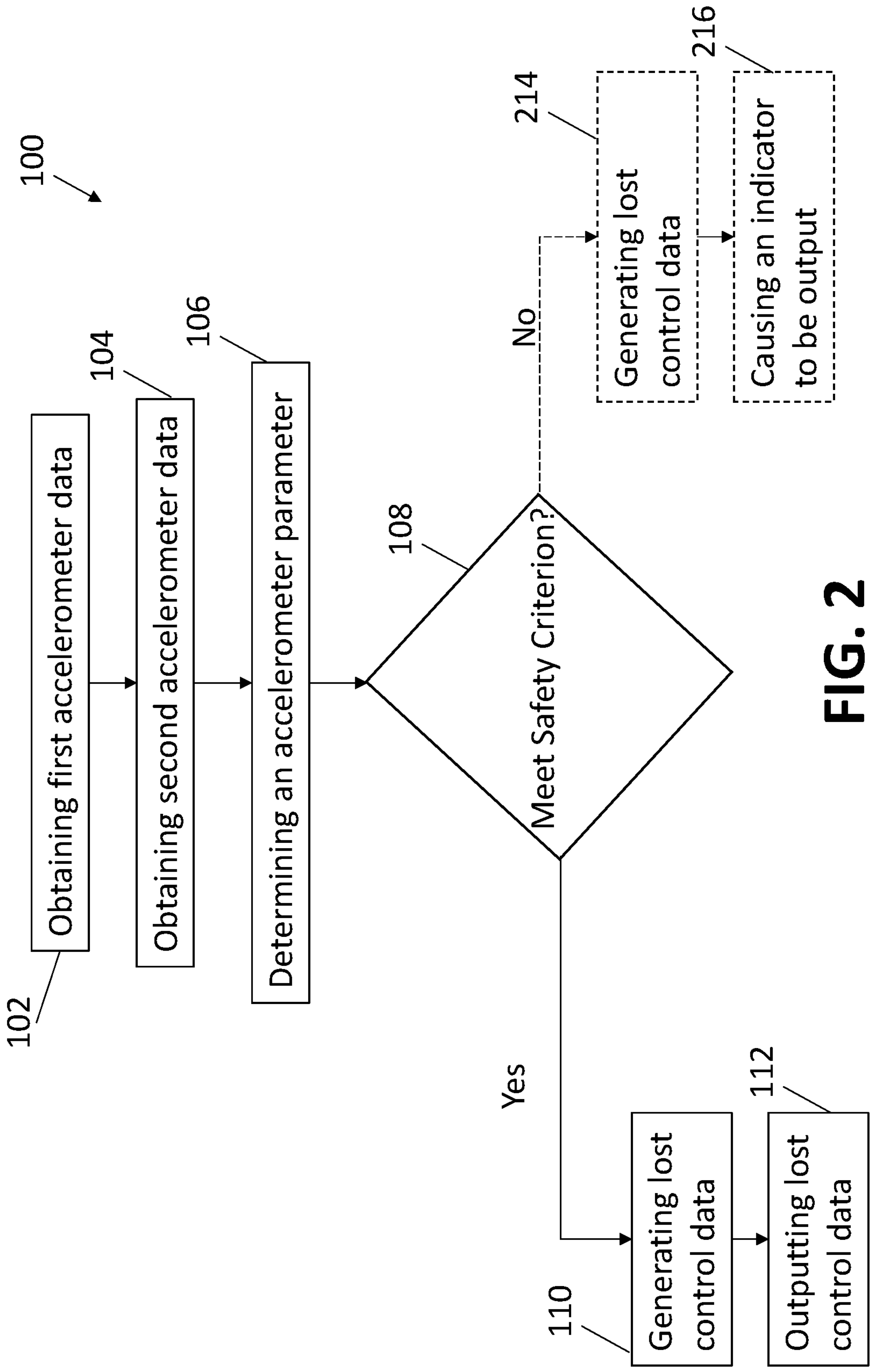
FIG. 2 shows an example embodiment of a method according to the disclosure.

FIG. 2 shows an example embodiment of a method 100 according to the disclosure. The method 100 can include any of the steps discussed with respect to method 100 of FIG. 1. FIG. 2 further shows, in accordance with the accelerometer parameter not meeting the safety criterion 108, the method 100 includes generating 214 warning control data and/or causing 216, based on the warning control signal, an indicator to be output by the electronic device. Causing 216 the indicator to be output comprises displaying a user interface object indicative of a warning on a display of the electronic device. Causing 216 the indicator to be output comprises displaying a user interface object representative of a location of the hearing aid on a display of the electronic device.

The method 100 can include, after causing 216 the indicator to be output, receiving a user input, and in accordance with receiving a user input indicative of an override of the warning control signal generating the lost control data and outputting the lost control data to the hearing aid. This can allow a user to override the warning control signal, such as if the user is sure the hearing aid is not currently being worn.

The method 100 can further include obtaining, from the hearing aid, environmental data indicative of a sound environment around the hearing aid and causing, based on the environmental data, an environmental notification to be output on a display of the electronic device. The method 100 can further include outputting, by the hearing aid, an indicator based on the lost control data. The method 100 can further include obtaining feedback data from the hearing aid and, in accordance with the feedback data being indicative of a user wearing the hearing aid, generating stop control data and outputting the stop control data to the hearing aid.

Figure 3B:
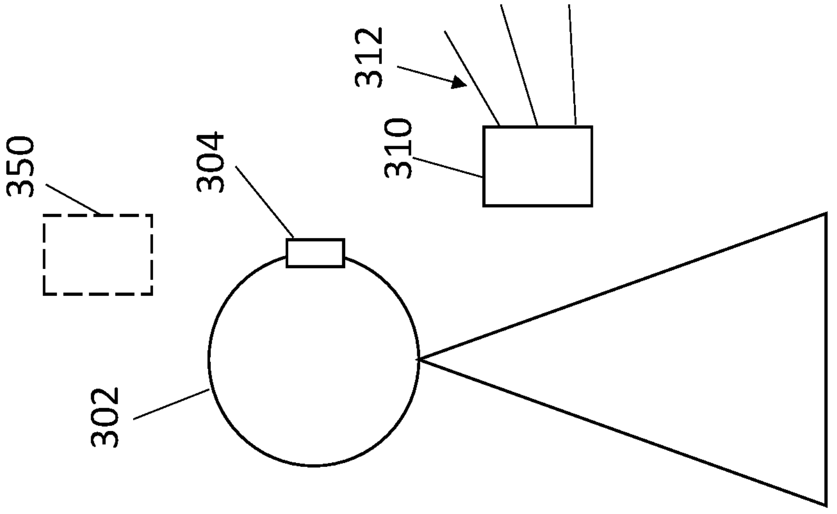
FIGS. 3A-3B show an example embodiment of a system according to the disclosure.
Figure 3A:
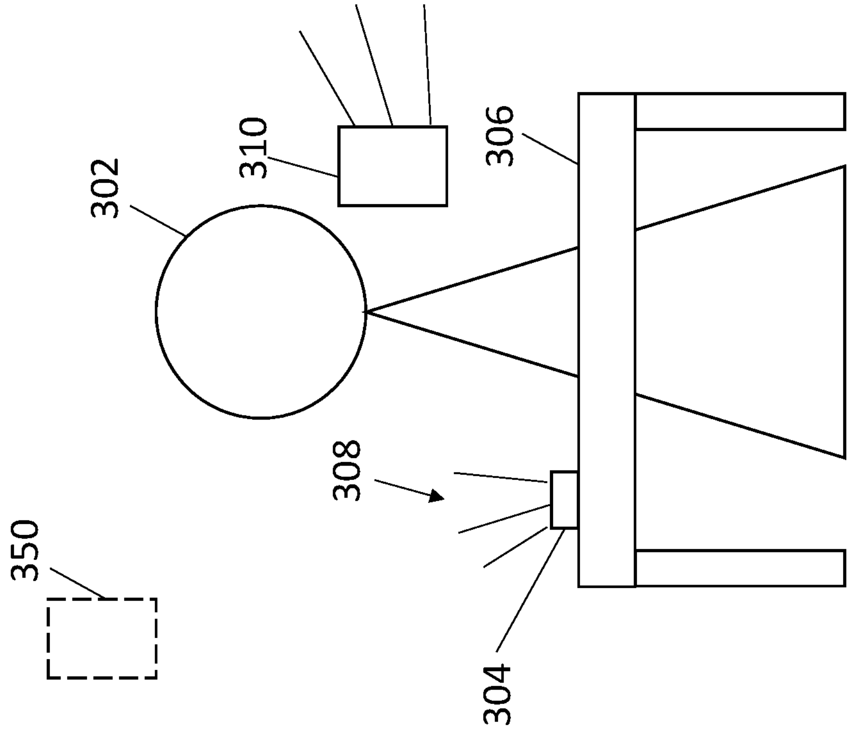

FIGS. 3A-3B show an example embodiment of a system and/or an electronic device 310 according to the disclosure. As shown, a user 302 can have a hearing aid 304 and an electronic device 310. The electronic device 310 can be a cellular telephone. The electronic device 310 has a memory and interface circuitry configured to communicate with the hearing aid 304. The electronic device 310 includes a processor configured to obtain first accelerometer data from the hearing aid 304 and determine second accelerometer data of the electronic device 310. The processor is configured to determine, based on the first accelerometer data and the second accelerometer data, an accelerometer parameter indicative of a difference between the first accelerometer data and the second acceleration data. The processor is configured to determine whether the accelerometer meets a safety criterion.

FIGS. 3A and 3B also show a system where the electronic device is a server 350. The server 350 can be configured to communicate with the hearing aid 304 and the electronic device 310 (otherwise known as the secondary electronic device 310). Therefore, processing can be performed in the server 350 rather than the secondary electronic device 310.

FIG. 3A and FIG. 3B illustrate a scenario where the acceleration parameter meets the safety criterion (FIG. 3A) and where the acceleration parameter does not meet the safety criterion (FIG. 3B).

As shown in FIG. 3A, the hearing aid 304 is located on a table 306 and thus the first accelerometer data is indicative of no acceleration. The hearing aid 304 can contain an accelerometer and/or a gyroscope which can provide the first accelerometer data. The user 302 is walking around with the electronic device 310, and thus the second accelerometer data is indicative of acceleration. The electronic device 310 can contain an accelerometer and/or a gyroscope which can provide the second accelerometer data. Accordingly, the acceleration parameter is indicative that the first accelerometer data and the second accelerometer data are different, and thus meets the safety criteria. The processor is then configured to generate lost control data and output the lost control data to the hearing aid 304. The lost control data can include instructions for the hearing aid 304 to output an auditory signal 308, as shown in FIG. 3A. The user 302 can then find the lost hearing aid 304.

As shown in FIG. 3B, the hearing aid 304 is located in the user's ear and thus the first accelerometer data is indicative of acceleration. Further, the user 302 is walking around with the electronic device 310, and thus the second accelerometer data is indicative of acceleration. Accordingly, the acceleration parameter is indicative that the first accelerometer data and the second accelerometer data are the same, and thus does not meet the safety criteria. In this example, the processor generates warning control data and causes, based on the warning control data, an indictor to be output by the electronic device. For example, the processor causes a user interface object 312 indicative of a warning to be displayed on the electronic device 310.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The invention claimed is:

1. A method for determining a location of a hearing aid, performed by an electronic device having a processor, a memory, and interface circuitry, the method comprising:

obtaining first accelerometer data from a hearing aid;

obtaining second accelerometer data from the electronic device;

determining, based on the first accelerometer data and the second accelerometer data, an acceleration parameter indicative of a difference between the first accelerometer data and the second accelerometer data; and in accordance with the acceleration parameter meeting a safety criterion:

generating lost control data; and
outputting the lost control data to the hearing aid;
wherein the lost control data comprises instructions for the hearing aid to output an auditory signal; and
wherein the lost control data comprises user data indicative of a hearing loss of the user.

2. The method of claim 1, wherein in in accordance with the acceleration parameter not meeting the safety criterion:
generating warning control data; and
causing, based on the warning control signal, an indicator to be output by the electronic device.

3. The method of claim 2, wherein causing the indicator to be output comprises displaying a user interface object indicative of a warning on a display of the electronic device.

4. The method of claim 2, wherein causing the indicator to be output comprises displaying a user interface object representative of a location of the hearing aid on a display of the electronic device.

5. The method of claim 2, further comprising, after causing the indicator to be output, receiving a user input, and in accordance with receiving a user input indicative of an override of the warning control signal:
generating the lost control data; and
outputting the lost control data to the hearing aid.

6. The method of claim 1, wherein the electronic device comprises a mobile telephone.

7. The method of claim 1, wherein the electronic device comprises a server.

8. The method of claim 1, wherein the lost control data comprises instructions for the hearing aid to vibrate or output a light.

9. The method of claim 1, the method further comprising:
obtaining, from the hearing aid, environmental data indicative of a sound environment around the hearing aid; and
causing, based on the environmental data, an environmental notification to be output on a display of the electronic device.

10. The method of claim 1, further comprising:
obtaining feedback data from the hearing aid;
in accordance with the feedback data being indicative of a user wearing the hearing aid, generating stop control data and outputting the stop control data to the hearing aid.

11. The method of claim 1, wherein after generating the lost control data and outputting the lost control data:
obtaining third accelerometer data from a hearing aid; and
in accordance with the third accelerometer data being indicative of movement, generating stop control data and outputting the stop control data to the hearing aid.

12. The method of claim 1, wherein:
obtaining the first accelerometer data comprises obtaining the first accelerometer data from a first accelerometer or a first gyroscope, and
obtaining second accelerometer data comprises obtaining the second accelerometer data from a second accelerometer or a second gyroscope.

13. A method for determining a location of a hearing aid, performed by an electronic device having a processor, a memory, and interface circuitry, the method comprising:
obtaining first accelerometer data from a hearing aid;
obtaining second accelerometer data from the electronic device;
determining, based on the first accelerometer data and the second accelerometer data, an acceleration parameter indicative of a difference between the first accelerometer data and the second accelerometer data; and
in accordance with the acceleration parameter meeting a safety criterion:
generating lost control data; and
outputting the lost control data to the hearing aid;
wherein in in accordance with the acceleration parameter not meeting the safety criterion:
generating warning control data;
causing, based on the warning control signal, an indicator to be output by the electronic device; and
after causing the indicator to be output, receiving a user input, and in accordance with receiving a user input indicative of an override of the warning control signal:
generating the lost control data; and
outputting the lost control data to the hearing aid.

14. A method for determining a location of a hearing aid, performed by an electronic device having a processor, a memory, and interface circuitry, the method comprising:
obtaining first accelerometer data from a hearing aid;
obtaining second accelerometer data from the electronic device;
determining, based on the first accelerometer data and the second accelerometer data, an acceleration parameter indicative of a difference between the first accelerometer data and the second accelerometer data; and
in accordance with the acceleration parameter meeting a safety criterion:
generating lost control data; and
outputting the lost control data to the hearing aid;
wherein the electronic device comprises a server.

15. A method for determining a location of a hearing aid, performed by an electronic device having a processor, a memory, and interface circuitry, the method comprising:
obtaining first accelerometer data from a hearing aid;
obtaining second accelerometer data from the electronic device;
determining, based on the first accelerometer data and the second accelerometer data, an acceleration parameter indicative of a difference between the first accelerometer data and the second accelerometer data;
in accordance with the acceleration parameter meeting a safety criterion:
generating lost control data; and
outputting the lost control data to the hearing aid;
obtaining, from the hearing aid, environmental data indicative of a sound environment around the hearing aid; and
causing, based on the environmental data, an environmental notification to be output on a display of the electronic device.

16. A method for determining a location of a hearing aid, performed by an electronic device having a processor, a memory, and interface circuitry, the method comprising:
obtaining first accelerometer data from a hearing aid;
obtaining second accelerometer data from the electronic device;
determining, based on the first accelerometer data and the second accelerometer data, an acceleration parameter indicative of a difference between the first accelerometer data and the second accelerometer data;
in accordance with the acceleration parameter meeting a safety criterion:
generating lost control data; and
outputting the lost control data to the hearing aid;
obtaining feedback data from the hearing aid; and in accordance with the feedback data being indicative of a user wearing the hearing aid, generating stop control data and outputting the stop control data to the hearing aid.

17. A method for determining a location of a hearing aid, performed by an electronic device having a processor, a memory, and interface circuitry, the method comprising:

obtaining first accelerometer data from a hearing aid;

obtaining second accelerometer data from the electronic device;

determining, based on the first accelerometer data and the second accelerometer data, an acceleration parameter indicative of a difference between the first accelerometer data and the second accelerometer data; and in accordance with the acceleration parameter meeting a safety criterion:

generating lost control data; and outputting the lost control data to the hearing aid;

wherein after generating the lost control data and outputting the lost control data:

obtaining third accelerometer data from a hearing aid; and in accordance with the third accelerometer data being indicative of movement, generating stop control data and outputting the stop control data to the hearing aid.

* * * * *